Nov. 12, 1957  J. C. HARTLEY  2,812,693
FORAMINOUS GUN MUZZLE
Filed May 11, 1953  5 Sheets-Sheet 1
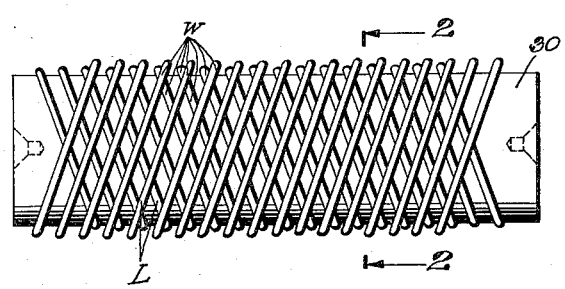
Fig_1
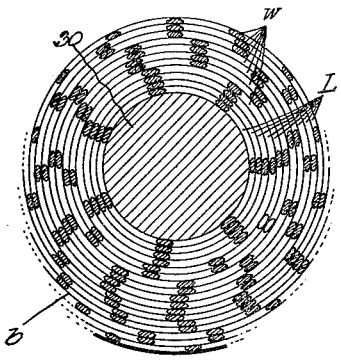
Fig_2
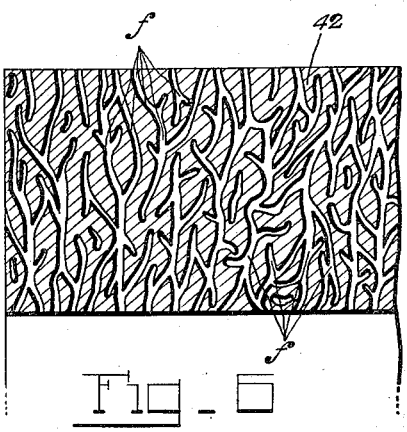
Fig_6
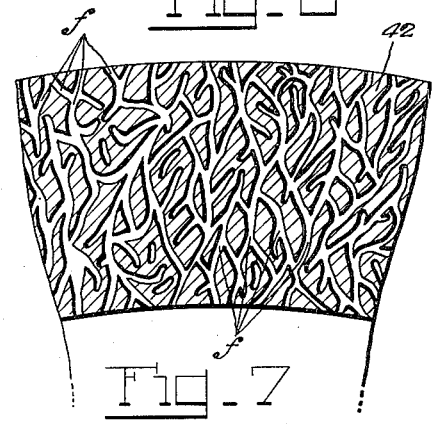
Fig_7
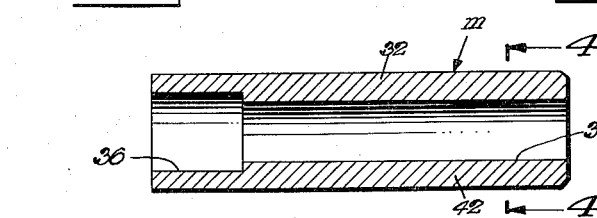
Fig_3  Fig_4
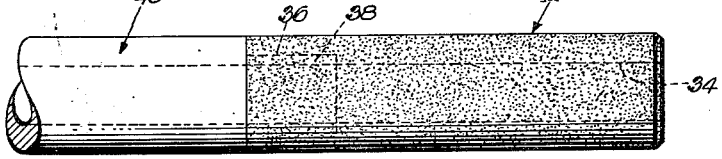
Fig_5
Inventor:
James C. Hartley
By: Steward & Spruegel
Attorneys.

Nov. 12, 1957  J. C. HARTLEY  2,812,693
FORAMINOUS GUN MUZZLE
Filed May 11, 1953  5 Sheets-Sheet 2

Inventor:
James C. Hartley
by: Steward & Sprunyel
Attorneys.

Inventor:
James C. Hartley
By: Steward & Sprigel
Attorneys.

Nov. 12, 1957    J. C. HARTLEY    2,812,693
FORAMINOUS GUN MUZZLE

Filed May 11, 1953    5 Sheets-Sheet 4

Inventor:
James C. Hartley
By: Steward & Sprugel
Attorneys.

Nov. 12, 1957 — J. C. HARTLEY — 2,812,693
FORAMINOUS GUN MUZZLE
Filed May 11, 1953 — 5 Sheets-Sheet 5

Inventor:
James C. Hartley
By: Steward & Sprungel
Attorneys.

United States Patent Office 2,812,693
Patented Nov. 12, 1957

2,812,693
FORAMINOUS GUN MUZZLE

James C. Hartley, Branford, Conn., assignor to Olin Mathieson Chemical Corporation, a corporation of Virginia Application May 11, 1953, Serial No. 354,298

12 Claims. (Cl. 89—14)

This invention relates generally to guns, and more especially, though not exclusively, to recoil brakes for guns.

Recoil brake action is to this day achieved by machined perforations in the muzzle ends or attached muzzle pieces of gun barrels, hereafter simply referred to as "muzzles." Due to the practical limitations imposed upon the number and sizes of machined perforations in present-day muzzles, the reaction between these perforations and the forward force components of the powder gases therein is necessarily limited, with the result that present-day recoil brakes leave much to be desired in the way of effectiveness. Further, present-day recoil brakes with their machined perforations appreciably increase muzzle blast and do not appreciably alleviate muzzle flash. These are some of the deficiencies of present-day recoil brakes, and these deficiencies are equally serious in guns for civilian and military uses. Thus, the effectiveness of present-day recoil brakes is not conducive to firing guns with that ease which makes for maximum accuracy, and does not alleviate the well known tendency of automatic weapons to climb during firing at high cyclic rates. Further, the inability of present-day recoil brakes effectively to alleviate muzzle blast and incidental muzzle flash places definite limitations upon their usefulness.

Accordingly, it is the primary object of the present invention to provide a muzzle for a gun which is relieved of the above-mentioned deficiencies of present-day muzzles.

It is another object of the present invention to provide a muzzle which has a much greater recoil brake action than any of the present-day muzzles, so as to be conducive to firing a gun with much greater ease than heretofore for maximum accuracy, and also greatly alleviate the tendency of an automatic weapon to climb during rapid firing.

It is a further object of the present invention to provide a muzzle which reacts to a much greater extent than heretofore with the forward force component of the powder gases in counteracting the recoil force with a maximum forward force.

Another object of the present invention is to provide a muzzle whose blast-dampening performance is so greatly improved that its use in guns is no longer objectionable on that account.

A further object of the present invention is to provide a muzzle which performs with greatly reduced muzzle flash, so that its use in military weapons is no longer objectionable on that account.

It is another object of the present invention to provide for a shotgun a muzzle which serves as a choke and also as a recoil brake of the aforementioned greater brake action.

A further object of the present invention is to provide a foraminous muzzle of the aforementioned improved type in which the foramina are so exceedingly numerous and closely adjacent each other that their total reaction with the forward force component of the powder gases creates in the muzzle a maximum momentary forward force that effectively counteracts the recoil force, and the foramina are of such average width that their sum total permits the escape of a substantial part of the powder gases in the muzzle.

Another object of the present invention is to provide a muzzle of the aforementioned foraminous type of which the formina are not only numerous, but are of small widths as well, so that only small quantities of the powder gases pass through the individual foramina and, in consequence, lose sufficient kinetic energy therein to escape without a blast, and the very substantial amount of the hot powder gases vented through the aggregate of the foramina is immediately cooled therein to the point where the usual kindling temperature of the exit gases is sufficiently lowered to reduce muzzle flash quite considerably.

It is a further object of the present invention to provide a muzzle of the aforementioned foraminous type in which by far the greater majority of the numerous foramina are at least with their inner ends inclined to the muzzle axis toward one end of the muzzle so that the total reaction of these foramina with the powerful forward force component of the powder gases is enhanced and the momentary recoil-counteracting force in the muzzle is accordingly increased.

It is another object of the present invention to provide a muzzle of the aforementioned foraminous type in which most, if not all, foramina are more or less tortuous in extent, thereby to reduce muzzle blast and flash even further.

Another object of the present invention is to provide a single-piece gun barrel for a rapid-fire arm of which the greater length is foraminous to the extent of having the porous characteristics required for efficient internal barrel-cooling purposes as described in my copending application Serial No. 189,643, filed October 11, 1950, and the remaining length forms a muzzle end of a coarser foraminous structure so as to perform with the aforementioned greater recoil brake action and greatly reduced muzzle blast and flash.

Further objects and advantages will appear to those skilled in the art from the following, considered in conjunction with the accompanying drawings.

In the accompanying drawings, in which certain modes of carrying out the present invention are shown for illustrative purposes:

Fig. 1 illustrates an initial step in a method of forming a foraminous muzzle of the present invention;

Fig. 2 is a section taken on line 2—2 of Fig. 1 and shows the same initial method step in a more advanced stage than in Fig. 1;

Fig. 3 is a longitudinal section through a finished muzzle embodying the present invention;

Fig. 4 is a cross-section through the muzzle on the line 4—4 of Fig. 3;

Fig. 5 shows the same muzzle attached to a gun barrel;

Figs. 6 and 7 are greatly enlarged fragmentary longitudinal and transverse sections, respectively, through the muzzle of Fig. 3;

Figure 8:
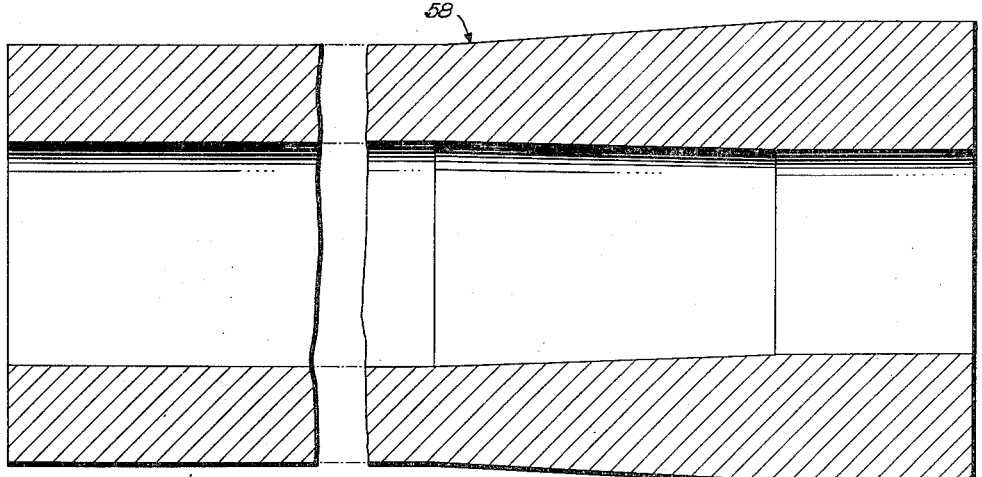
Fig. 8 is an enlarged longitudinal section through another foraminous muzzle prior to its finish-formation into a combined choke and recoil brake.

The gun muzzle of the present invention relies for its superior performance on a certain foraminous state of its structure. As long as the structure has the right foraminous state, the gun muzzle will have the desired superior performance regardless of the manner in which the foraminous structure was produced. Foraminous material suitable for the superior muzzle of the present invention is generally characterized by foramina which in a muzzle length comparable to, or even shorter than, the average perforated length of present-day muzzles are as numerous as possible, yet have sufficient average width so that their combined number permits the escape therethrough of a substantial part of the powder gases in the muzzle.

There has recently been developed a foraminous material which, if given the above-mentioned characteristics, is well suited for present purposes. This foraminous material, which is formed by superposed weld-joined and permanently interpressed layers of spaced wires of which the wires in successive layers intersect each other, may be produced in accordance with the following method. Thus, wires w may be wound in spaced relation on an arbor 30 in progressive layers L, starting in the fashion shown in Fig. 1. These wire layers L are built up into a cylindrical body b (Fig. 2) until their number is sufficient to obtain the desired wall thickness of the foraminous end product. The wires in successive layers L are wound so that they intersect each other and the openings or interstices between them preferably assume a regular geometric pattern or patterns, such as the diamond shape in Fig. 1, for instance. The wires in the body b are next joined at their intersections. This may conveniently be achieved by subjecting the body b on the mandrel 30 in a furnace to an elevated temperature at which the wires become sintered or welded together at their intersections. To prevent the wires in the bottom layer of the body b from becoming welded to the mandrel 30, the latter is preferably coated with any suitable substance that resists the sintering temperature. After the wires of the body b are thus sintered or welded together at their intersections, the body is stripped from the mandrel. If the wire body b is relatively long, the same may be wound on a collapsible mandrel to facilitate its removal therefrom. The cylindrical wire body b is next compacted into a rigid unitary sleeve or tubular member 32 (Fig. 3) by subjecting the superposed wire layers of the body b to a suitable mechanical process such as swaging, rolling, forging, or the like. In thus compacting the superposed wire layers of the body b, the wires of successive layers L become permanently interpressed and mechanically deformed into an integral mass wherein the individual wires w, owing to the intersecting arrangement thereof, leave between them only narrow gaps or foramina f (Figs. 6 and 7) of the beforementioned general characteristics suited for the purpose in mind. After compacting, the member 32 (Fig. 3) has, for all practical intents and purposes and despite the perceptible foramina, the appearance of a tubular member made from solid steel stock, and has adequate strength to withstand the forces to which it will be subjected in its performance as a recoil brake and blast and flash reducer. The wall thickness of the compacted member 32 may be a fraction of that of the original wire body b, depending upon the size or sizes of the wires and their spacing in the body b and also upon the extent to which the wire layers in the latter are compacted. The member 32 may next be formed to accurate dimensions to obtain the muzzle m (Fig. 3), and its bore 34 may be recessed at 36 for fitted reception on the diametrically reduced discharge end 38 of a gun barrel 40 (Fig. 5). The muzzle m may be permanently mounted on the reduced discharge end 38 of the gun barrel by being brazed thereto, for instance. For certain purposes, the muzzle m may releasably be mounted on the discharge end of a gun barrel by being screwed thereon, for instance.

The foramina f formed in the wall 42 of the muzzle m may in their arrangement be roughly like those shown in Figs. 6 and 7. Thus, the foramina f formed by the beforementioned compacting of the superposed wire layers of the initial wire body b, while being of random tortuous extent and having numerous lateral branches many of which communicate with each other, predominantly extend generally radially in the muzzle wall 42. The number or density of the foramina and their average width depend, of course, on the size or sizes of the original wires w and their spacing in the wire body b, and also on the degree of compacting to which the wire layers of the body b are subjected in the formation of the member 32. For present purposes, the foramina f are as closely adjacent and numerous as possible so that their reaction with the forward force component of powder gases in the muzzle m results in a forward or recoil-counteracting force of maximum magnitude in the muzzle, and the average width of the foramina f is such that their total number permits the escape therethrough of a substantial part of the powder gases in the muzzle. In consequence, the recoil brake action of the present muzzle m is very considerably increased over that of present-day perforated muzzles, so much so that the present muzzle is conducive to firing the gun with much greater ease than heretofore for maximum accuracy, and greatly alleviates the tendency of an automatic weapon to climb during rapid firing.

The foramina f in the wall 42 of the present muzzle are also sufficiently small in average width to permit only small quantities of the powder gases to pass through the individual foramina, thereby depriving these small quantities of powder gases of sufficient kinetic energy to escape without a blast and incidental flash. The tortuous extent of the foramina f is further conducive to prevent a blast and incidental flash by the powder gases escaping therethrough. Hence, muzzle blast and incidental flash are now confined solely to the end of the present muzzle, and this blast and flash are greatly reduced from the over-all blast and flash from present-day perforated muzzles. It is for this reason also that the use of the present muzzle is highly desirable and advantageous.

Figure 9:
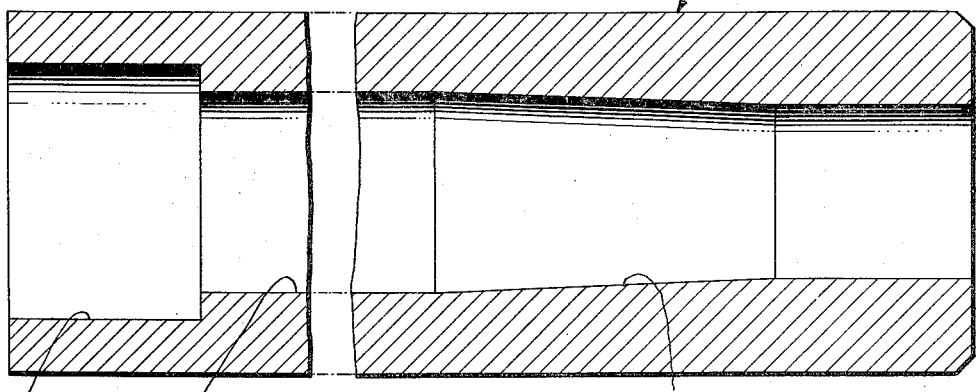
Fig. 9 is a section similar to Fig. 8, showing the combined choke and recoil brake in its finished form.
Figure 10:
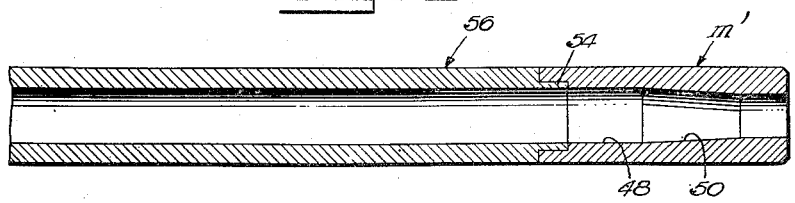
Fig. 10 is a fragmentary longitudinal section through a shotgun barrel and the attached choke and recoil brake of Fig. 9.

Reference is now had to Fig. 9 which shows, in section, a muzzle m' for a shotgun. To this end, the muzzle m' is provided in its longitudinal passage 48 with a choke section 50 which in this instance is frustoconical. The muzzle m' is preferably made of the same foraminous material as the previously described muzzle m and, accordingly, has a greatly improved recoil brake action and also a greatly reduced muzzle blast and flash. The longitudinal passage 48 in the muzzle m' may at one end be enlarged as at 52 for the attachment of the muzzle to the reduced discharge end 54 of a shotgun barrel 56 by brazing or in any other suitable manner (Fig. 10). For replacement purposes, the muzzle m' may releasably be attached to the discharge end of a shotgun barrel by being screwed thereon, for instance.

The initial wire body of the muzzle m' may be wound on a cylindrical mandrel as before, except that a number of top layers of the wires are spaced progressively further from one end of the wire body to form thereon an intermediate externally tapered section corresponding in length to the internally tapered choke section 50 of the finished muzzle. After the wires in the body thus formed have been sintered together at their intersections, the body is compacted, as before, into a tubular member of a rigid and unitary wall structure which has foraminous characteristics like or similar to those shown in Figs. 6 and 7. In thus compacting the wire body, the external taper thereon is preferably worked gradually inwardly as depicted in the partially compacted member 58 in Fig. 8, so that the member has the internally tapered choke section 50 at the conclusion of the compacting operation (Fig. 9). The member thus compacted may then be accurately sized by machining or in any other suitable manner.

In order that the foramina in the wall structures of the muzzles m and m' may perform their before-mentioned designated functions of greater recoil brake action and reduced muzzle blast and flash, they are necessarily of relatively small average width, measured from a few thousandths of an inch upwards, wherefore there is always a chance of their becoming clogged eventually. In order to prevent these foramina from becoming clogged even eventually, their average width may be increased, suddenly or gradually, in their extension to the periphery of the wall structure in a manner like or similar to that shown in Figs. 12 and 13. Thus, inner end lengths $f1$ of the foramina $f$ are of the average width required to achieve the desired greater recoil brake action and reduced muzzle blast and flash, while the remaining lengths $f2$ of these foramina have a gradually increasing average width in the example shown in Figs. 12 and 13. There is little likelihood that the foramina $f$ of outwardly increasing widths in the wall structure of Figs. 12 and 13 become clogged ever. These foramina are in fact self-cleaning since their narrowest inner ends are subjected to the full force of the escaping powder gases and the kinetic energy of the latter is appreciably reduced only when they pass through the wider outer lengths of these foramina.

Figure 11:
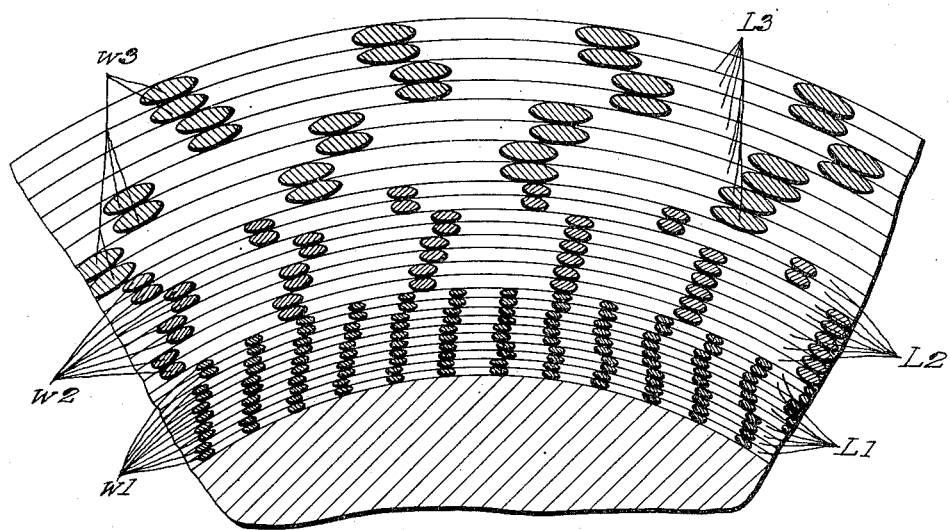
Fig. 11 illustrates an initial step in another method of forming a foraminous muzzle encompassed by the present invention.
Figure 12:
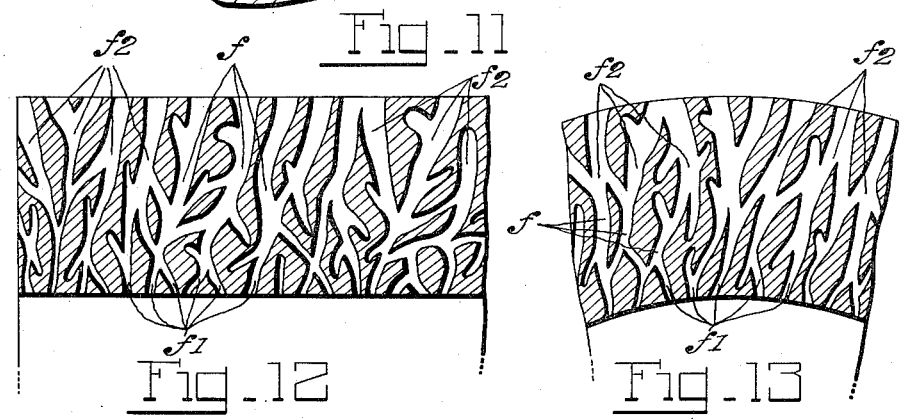
Figs. 12 and 13 are enlarged fragmentary longitudinal and transverse sections, respectively, through the finished modified muzzle.
Figure 13:
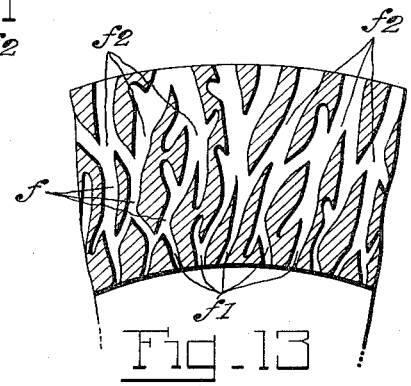

Foramina $f$ of varying widths may be obtained by varied spacing of the wires in successive layers or successive groups of layers, or by the use of wires of different gauges in successive layers or successive groups of layers, or both, in the initial wire body of the wall structure of Figs. 12 and 13. Fig. 11 shows an example of an arrangement of the wires in the superposed layers of a wire body with which to obtain foramina of varying widths. Thus, wires $w1$ of relatively small gauge are arranged in comparatively closely spaced relation in a number of bottom layers L1 on a mandrel 30'. Next, wires $w2$ of larger gauge are arranged in more widely spaced relation in a number of intermediate layers L2. Finally, wires $w3$ of even larger gauge are arranged in even more widely spaced relation in a number of top layers L3. On sintering the wires together at their intersections and compacting the wire body thus formed, a tubular member of a wall structure with foramina of varying widths like or similar to those shown in Figs. 12 and 13 is obtained.

Figure 14:
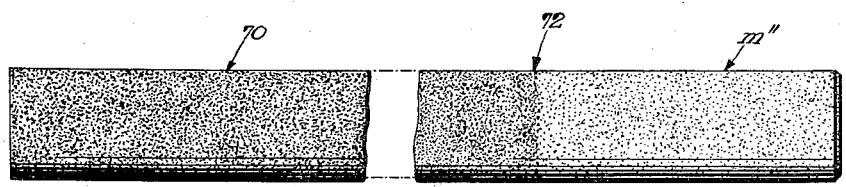
Fig. 14 is a side view of a single-piece foraminous gun barrel and muzzle end embodying the present invention in another modified manner.
Figure 15:
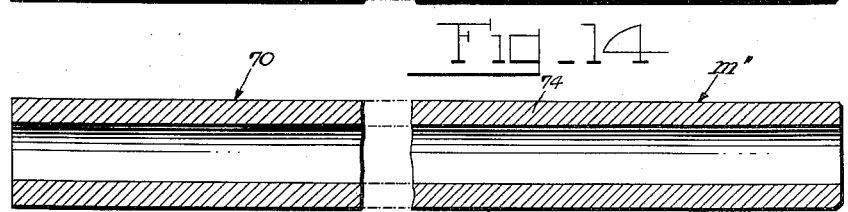
Fig. 15 is a longitudinal section through the single-piece gun barrel and muzzle end of Fig. 14.

Reference is now had to Figs. 14 and 15 which show a muzzle m" of the present invention combined with a gun barrel 70 of the porous characteristics shown and described in my aforementioned copending application Serial No. 189,643, to form a single-piece barrel 72 with a recoil brake. The gun barrel shown and described in said copending application is primarily adapted for rapid-fire arms, and is characterized by being porous to such a degree as to permit penetration by coolant under pressure from the outside thereof to the bore therein for efficient cooling of the barrel, and the barrel portion 70 of the single-piece gun barrel 72 has the same porous characteristics. On the other hand, the integral muzzle end m" of the single-piece gun barrel 72 has the foraminous characteristics of the previously described muzzle m for greater recoil brake action and reduced muzzle blast and flash.

Figures 16, 17:
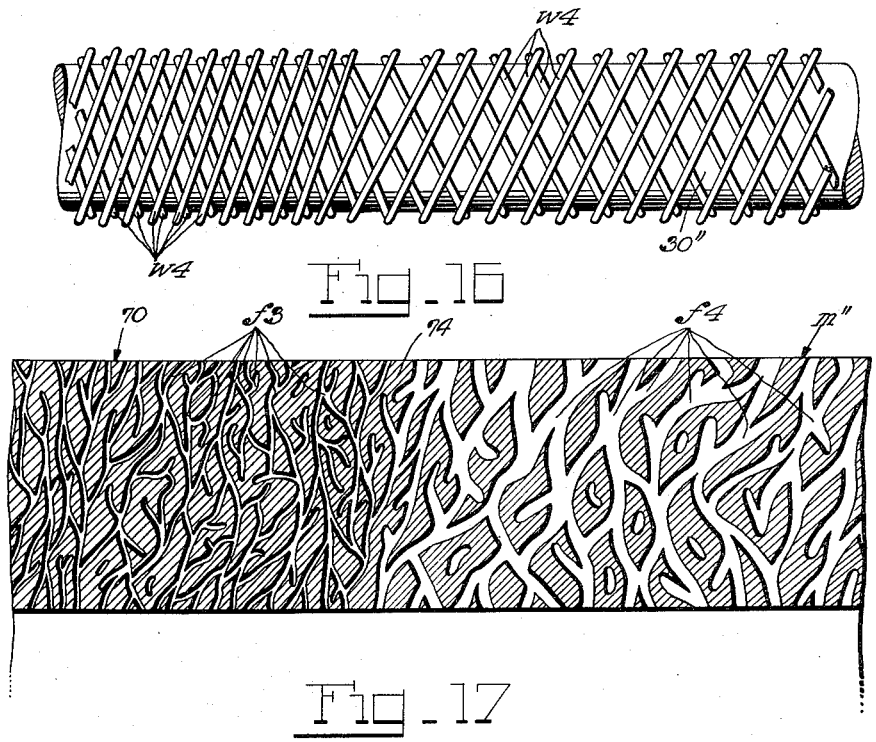
Fig. 16 illustrates an initial step in a method of forming the single-piece gun barrel and muzzle end of Figs. 14 and 15.
Fig. 17 is an enlarged fragmentary longitudinal section through the single-piece gun barrel and muzzle end of Figs. 14 and 15.

The single-piece gun barrel 72 of Figs. 14 and 15 may advantageously be formed by a compacted wire body in which the foramina $f3$ in the barrel portion 70 are narrower and more numerous than the foramina $f4$ in the muzzle end m" (Fig. 17). As previously stated, the number and average widths of the foramina in the wall structure of a compacted tubular member may be regulated by the size or sizes of the wires and their spacing in the superposed layers in the initial wire body from which the member is formed, wherefore several modes of arranging the wires in the initial wire body for the single-piece gun barrel 72 immediately suggest themselves. By way of example, Fig. 16 indicates a possible mode of arranging the wires in the initial wire body to obtain the single-piece gun barrel 72 with the different foramina $f3$ and $f4$ (Fig. 17) on compacting the wire body. Thus, wires $w4$ may be wound on a mandrel 30" in closely spaced relation in successive layers throughout the longitudinal extent of the barrel portion 70 of the single-piece gun barrel 72 to be formed, and these same wires $w4$ may on the same mandrel be wound in more widely spaced relation in successive layers throughout the longitudinal extent of the muzzle end m" of the single-piece gun barrel 72 to be formed. After sintering together the wires in the successive layers at their intersections and on compacting the wire body thus formed, there is obtained the tubular single-piece gun barrel 72 (Figs. 14 and 15) with the different foramina $f3$ and $f4$ in its wall structure 74 (Fig. 17).

Figure 18:
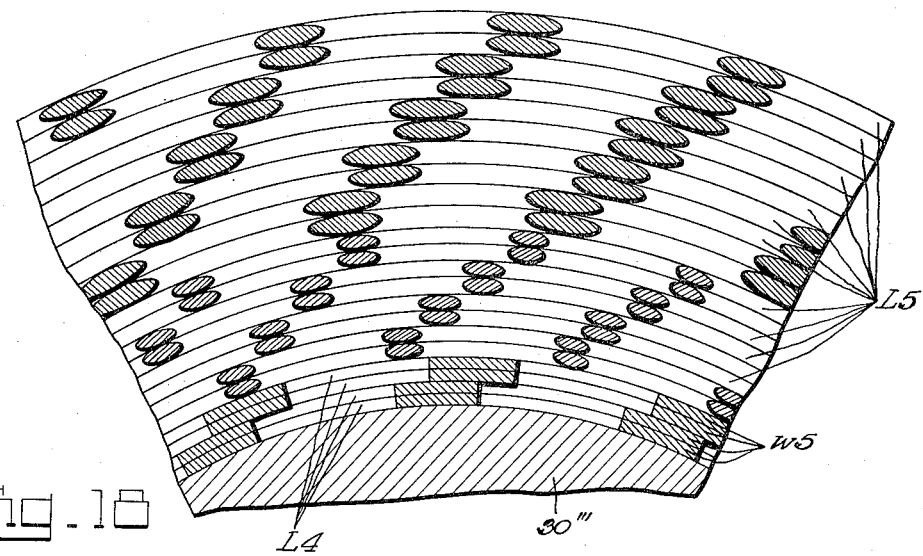
Fig. 18 illustrates an initial step in a method of forming a foraminous muzzle embodying the present invention in a further modified manner.

To obtain in any of the muzzles described hereinbefore a bore of desired surface characteristics, the wire body from which the same is formed may in a few of its bottom layers L4 on a mandrel 30''' have ribbon-type wires $w5$ (Fig. 18). The wires in the remaining layers L5 may be round or of any other suitable cross-section, and may also be of different gauges and of different spacing in successive groups of layers. The innermost ribbon-type wires $w5$ in the compacted tubular member define an inner wall therein which exhibits somewhat greater surface uniformity between adjacent foramina than the inner wall of a tubular member formed by round wires, for instance. It is, of course, equally feasible to provide ribbon-type wires in some of the top layers of the wire body in Fig. 18 in order to obtain desired surface characteristics of the outer periphery of the compacted tubular member.

Figure 19:
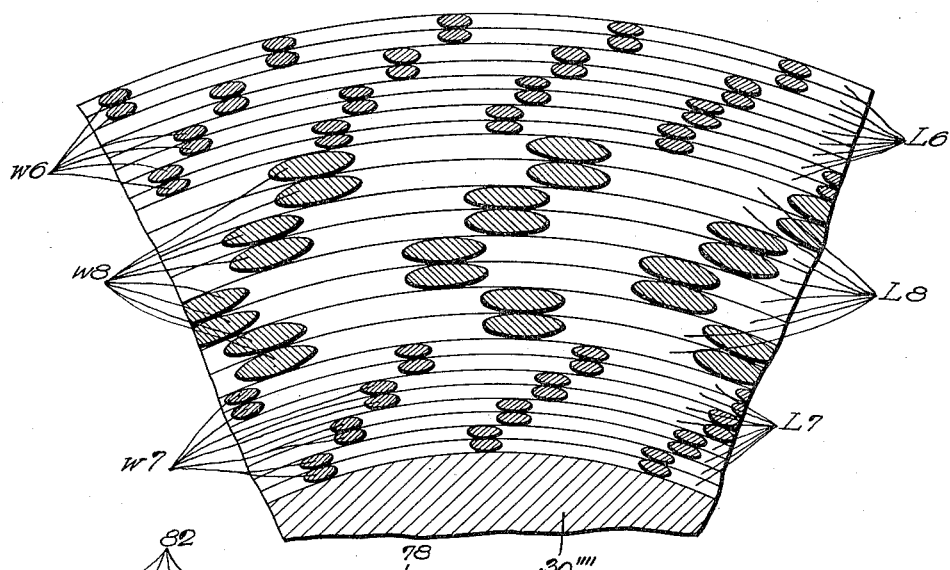
Fig. 19 illustrates an initial step in a method of forming a foraminous muzzle embodying the present invention in another modified manner.

It will readily be appreciated that the wires in the inner and outer layers of a wire body such as that shown in Fig. 2, for instance, will on compacting be deformed to a greater extent than the wires in the intermediate layers, with the result that the foramina in the compacted member are generally somewhat wider in their intermediate lengths than in their end lengths. This may be corrected by spacing the wires in the intermediate layers of a wire body closer than in the inner and outer layers thereof, or by using wire of a different gauge or gauges in the intermediate layers than in the inner and outer layers thereof, or both. An example of a wire arrangement in a wire body achieving in its compacted form foramina of substantially uniform widths throughout is indicated in Fig. 19 in which the wires w6 and w7 in a number of top and bottom layers L6 and L7 on a mandrel 30'''' are of the same gauge and are spaced substantially equally, while the wires w8 in the intermediate layers L8 are of larger gauge and spaced from each other somewhat more widely than the wires w6 and W7 in the top and bottom layers L6 and L7.

Figure 20:
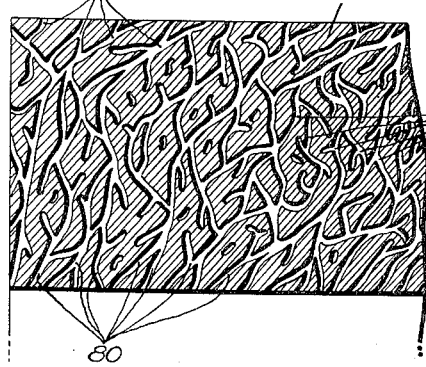
Fig. 20 is an enlarged fragmentary longitudinal section through a foraminous muzzle embodying the present invention in still another modified manner.

Reference is now had to Fig. 20 which shows a modified with structure 76 of any of the hereinbefore described muzzles. The present modified wall structure 78 differs from any of the previous muzzle wall structures in that at least inner end lengths 80 of at least a predominant number of the foramina f therein are inclined to the muzzle axis in such a general direction that their reaction with the forward force component of the powder gases in the muzzle is increased to a maximum and the forward or recoil-counteracting force exerted in the muzzle is accordingly increased to a maximum. The described inclination of at least the inner end lengths 80 of a predominant number of the foramina f may be achieved by controlled swaging, for instance, of the initial wire body of the wall structure 78 in such wise that the applied swaging forces have components radially and longitudinally of the final wall structure. In thus swaging the initial wire body in the mentioned controlled manner, also outer end lengths 82 of a predominant number of the foramina f in the wall structure 78 will be inclined similarly as the inner end lengths 80 of the foramina (Fig. 20).

The invention may be carried out in other specific ways than those herein set forth without departing from the spirit and essential characteristics of the concept disclosed, and the present embodiments are, therefore, to be considered in all respects as illustrative and not restrictive, and all changes coming within the meaning and equivalency range of the appended claims are intended to be embraced therein.

What is claimed is:

1. A muzzle piece for a gun, comprising a tubular member having a cylindrical wall formed of superimposed layers of spaced wires, the wires in successive layers intersecting each other and being weld-joined and mechanically deformed into a compact, rigid, integral mass having multitudinous foramina adapted to react with the forward force component of powder gases in said member and exert a maximum recoil-counteracting force on the latter.

2. A muzzle piece for a gun as defined in claim 1, wherein at least inner end lengths of a predominant number of said foramina are inclined to the axis and toward one end of said member, said foramina being of such average width that they permit the escape therethrough of a substantial part of the powder gases in said member.

3. A muzzle piece for a gun as defined in claim 1, wherein the inner end lengths of said foramina are of such average width that they permit the escape therethrough of a substantial part of the powder gases in said member, and the remaining lengths of said foramina are of larger average width than said inner end lengths thereof.

4. A muzzle piece for a gun as defined in claim 3, wherein the average width of said remaining lengths of said foramina gradually increases outwardly.

5. A single-piece barrel for rapid-fire arms, comprising a tubular member having a cylindrical wall defining a central longitudinal bore, said wall being formed of superimposed layers of spaced wires, the wires in successive layers intersecting each other and being weld-joined and mechanically deformed into a compact, rigid, integral mass having multitudinous foramina, the greater length of said cylindrical wall being provided with closely adjacent multitudinous first foramina of an average width to render said greater wall length porous for penetration by coolant under pressure from the outside of said cylinder length to said bore therein, and the remaining length of said wall serving as a muzzle end and having in its wall closely adjacent multitudinous second foramina adapted to react with the forward force component of powder gases in said bore and exert a maximum recoil-counteracting force on said cylinder, said second foramina being of larger average width than said first foramina so that they permit the escape therethrough of a substantial part of the powder gases in said bore.

6. A single-piece barrel for rapid-fire arms as set forth in claim 5, in which at least inner end lengths of at least a predominant number of said second foramina are inclined to the axis and toward one end of said cylinder for their increased reaction with the forward force component of the powder gases in said bore and the exertion of a correspondingly increased recoil-counteracting force on said cylinder.

7. A single-piece barrel for rapid-fire arms as set forth in claim 5, in which inner end lengths of said second foramina are of an average width to permit said escape therethrough of a substantial part of the powder gases in said bore, and the remaining lengths of said second foramina are of larger average width than said inner end lengths thereof.

8. A single-piece barrel for rapid-fire arms as set forth in claim 5, in which inner end lengths of said second foramina are of an average width to permit said escape therethrough of a substantial part of the powder gases in said bore, and the widths of the remaining lengths of said second foramina gradually increase outwardly.

9. A muzzle piece for a gun, comprising a tubular member having a cylindrical wall defining a central longitudinal bore, said wall being formed of superimposed layers of spaced wires, the wires in successive layers intersecting each other and being weld-joined and mechanically deformed into a compact, rigid, integral mass having multitudinous foramina adapted to react with the forward force component of powder gases in said member and exert a maximum recoil-counteracting force on the latter, and said foramina being of such average width that they permit the escape therethrough of a substantial part of the powder gases in said member, and means on one end of said member for its attachment to the discharge end of a gun barrel.

10. A muzzle piece for a gun, comprising a tubular member having a cylindrical wall formed of superimposed layers of spaced wires, the wires in successive layers intersecting each other and being weld-joined and mechanically deformed into a compact, rigid, integral mass having multitudinous foramina adapted to react with the forward force component of powder gases in said member and exert a maximum recoil-counteracting force on the latter, the wires in a number of bottom layers being of smaller gauge and differently spaced than the wires in the remaining layers so that inner end lengths of said foramina have an average width to permit the escape of a substantial part of the powder gases in said member through said inner end lengths, and the remaining lengths of said foramina have a greater average width than said inner end lengths thereof.

11. A muzzle piece for a gun as defined in claim 10, wherein the wires in successive groups of layers starting with the bottom layer are differently spaced and of progressively larger gauges, respectively, so that inner end lengths of said foramina have an average width to permit the escape of a substantial part of the powder gases in said member through said inner end lengths, and the widths of the remaining lengths of said foramina increase substantially gradually toward the outside.

12. A muzzle piece for a gun as defined in claim 10, wherein the wires in at least the bottom layer are of ribbon-type and the wires in the remaining layers are so sized and spaced that the inner ends of said foramina have such an average width, not smaller than that of any other parts of said foramina, that they permit the escape therethrough of a substantial part of the powder gases in said member.

References Cited in the file of this patent

UNITED STATES PATENTS

| | | |
|---|---|---|
| 1,127,250 | Humm | Feb. 2, 1915 |
| 1,773,260 | Cutts | Aug. 19, 1930 |
| 2,490,829 | Noll | Dec. 13, 1949 |